United States Patent [19]

Gunshi et al.

[11] Patent Number: 4,733,261
[45] Date of Patent: Mar. 22, 1988

[54] AUTOMATIC FOCUSING CAMERA

[75] Inventors: Hirokazu Gunshi; Minoru Yamada; Eiji Ito; Masaru Nagai; Kenji Miyama; Masataka Sawamura, all of Hachioji, Japan

[73] Assignee: Konishiroku Photo Industry Co., Ltd., Tokyo, Japan

[21] Appl. No.: 61,028

[22] Filed: Jun. 10, 1987

Related U.S. Application Data

[63] Continuation of Ser. No. 740,649, Jun. 3, 1985, abandoned.

[30] Foreign Application Priority Data

| Jun. 8, 1984 | [JP] | Japan | 59-117,827 |
| Jun. 8, 1984 | [JP] | Japan | 59-117,828 |
| Jun. 8, 1984 | [JP] | Japan | 59-117,829 |
| Jun. 8, 1984 | [JP] | Japan | 59-117,830 |
| Jun. 13, 1984 | [JP] | Japan | 59-122,223 |

[51] Int. Cl.⁴ .............................................. G03B 3/00
[52] U.S. Cl. ................................. 354/400; 354/195.1
[58] Field of Search ............... 354/400, 401, 402, 403, 354/404, 405, 406, 407, 408, 195.1

[56] References Cited

U.S. PATENT DOCUMENTS

| 3,720,148 | 3/1973 | Harvey | 354/403 |
| 4,206,990 | 6/1980 | Imura et al. | 354/195.1 |
| 4,229,089 | 10/1980 | Kitai et al. | 354/405 |
| 4,429,968 | 2/1984 | Taka et al. | 354/403 |
| 4,504,132 | 3/1985 | Martin et al. | 354/195.1 |
| 4,519,691 | 5/1985 | Yamada et al. | 354/400 |
| 4,540,264 | 9/1985 | Daitoku et al. | 354/400 |
| 4,576,460 | 3/1986 | Daitoku et al. | 354/400 |
| 4,598,989 | 7/1986 | Yamada et al. | 354/400 |

Primary Examiner—Russell E. Adams
Attorney, Agent, or Firm—Bierman & Muserlian

[57] ABSTRACT

An automatic focusing camera having a driving mechanism for moving a taking lens on the basis of a signal provided by a distance measuring device. The lens position is controlling by a cam member capable of being turned stepwise in one direction about the optical axis of a taking lens by a pulse signal given by the distance measuring device. The driving mechanism has a light quantity controlling movable coil member and a taking lens driving and controlling movable coil member. Both the light quantity controlling movable coil member and the taking lens driving and controlling movable coil member are disposed within a gap and exposed to a common magnetic field.

22 Claims, 8 Drawing Figures

AUTOMATIC FOCUSING CAMERA

This is a continuation of application Ser. No. 740,649, filed June 3, 1985 and now abandoned.

BACKGROUND OF THE INVENTION

1. Field of the Invention:

The present invention relates to an automatic focusing camera equipped with an electromagnetically driven taking lens focusing device.

2. Description of the Prior Art:

Driving mechanisms of the motor-drivn system for focusing the lens unit of a camera and driving mechanisms of the electromagnetic driving system for the same purpose have been proposed. The former driving mechanisms are classified into driving mechanisms, as those employed in a lens shutter camera, which drive the taking lens to a position corresponding to a nearest range by a motor in conjunction with film winding operation after the completion of taking operation and move the taking lens to a position corresponding to a range signal by a spring immediately before the next taking operation, and driving mechanisms, as those employed as an automatic focusing device in a single-lens reflex camera, in which the direction and the angle of rotation of a motor for driving the taking lens are decided by a range signal. both those driving mechanisms need a reduction gear and mechanism for converting a rotary motion into a linear motion, and hence it has become difficult to build those conventional driving mechanisms in a compact and lightweight cameras in a recent years with the recent trend of cameras toward progressive reduction in size and weight.

Accordingly, the latter driving mechanisms, namely, electromagnetic driving mechanism, have often been employed in recent years. The electromagnetic driving mechanism for focusing the taking lens is provided with two permanent magnets fixedly disposed opposite to each other with a small gap therebetween to reduce loss in the magnetic circuit and a movable coil member disposed within the gap, and is adapted to drive the taking lens to bring the same into focus by the rotary or linear motion of the movable coil member. Therefore, the electromagnetic driving mechanism is subject to a restriction that the taking lens can be driven for focusing operation only in opposite directions according to the direction of an electric current, namely, from a position corresponding to a nearest range toward a position corresponding to an infinite range or from a position corresponding to an infinite range toward a position corresponding to a nearest range.

In an improved electromagnetic driving mechanism of the above-mentioned system, two movable coil members are disposed within the gap, one for adjusting the position of a cam surface for deciding the position of the taking lens and the other for moving the taking lens so that the taking lens is brought into abutment with the cam surface where the taking lens is focused. This electromagnetic driving mechanism is able to control the taking lens, at the most, in six steps between a position corresponding to a nearest range and a position corresponding to an infinite range. Furthermore, this electromagnetic driving mechanism has disadvantages that the construction is complicated and large.

Methods have been proposed as means to overcome those structural and functional disadvantages of the conventional electromagnetic driving mechanism, in which a signal provided by the range finder is converted into A pulse current, the movable coil member is caused to rock by the pulse current and the rocking motion of the movable coil member is transmitted to an external cam member to move the cam member stepwise.

According to one of such methods disclosed in Japanese Patent Laid-open No. 58-43434, the taking lens is controlled to a focus position in increased steps by an appropriate combination of the number of pulse signals given to the movable coil member and the number of steps of the external cam member.

However, since the cam member must be returned to the initial position after the completion of every taking operation, the construction of the mchanism is somewhat complicated and, furthermore, since a mechanism for moving the cam member stepwise is included in the electromagnetic driving mechanism, the cam surface needs to be formed within a limited space, and hence the cam surface is unable to have a sufficient length, which makes accurate focusing difficult.

Furthermore, in addition to the employment of an electromagnetic driving mechanism for focusing the taking lens, a trend of employing an electromagnetic shutter mechanism for controlling the operation of the shutter has been increased owing to the simple and compact construction of the electromagnetic shutter mechanism.

An electromagnetic driving mechanism for driving and controlling both a taking lens focusing mechanism and a shutter mechanism needs at least two movable coil members and those movable coil members must be disposed within a magnetic field of an appropriate flux density so that the movable coils are subjected to a sufficient electromagnetic force.

Accordingly, in the conventional electromagnetic driving mechanism, each movable coil member is disposed individually in a magnetic field formed exclusively for the same to enable the movable coil member to produce a sufficient driving force. This configuration, however, requires component parts of an increased number and a large space, which is disadvantageous to reducing the size and cost of a camera.

Japanese Utility Model Laid-Open No. 58-180538 discloses a mechanism for overcoming the above-mentioned disadvantages of the conventional electromagnetic driving mechanism. This mechanism is designed so as to reduce the number of parts and space by holding a plurality of permanent magnets in a row between a pair of yokes and movable coil members are disposed in magnetic fields formed on both sides of the permanent magnets respectively. This mechanism requires an extremely difficult work to align a plurality of permanent magnets accurately and the taking lens focusing operation and the shutter controlling operation cannot smoothly be carried out due to excessive unbalance in magnetic field intensity between the magnetic field on one side of the permanent magnets and that on the other side of the same, if the mechanism is not assembled accurately.

In a known electromagnetic driving mechanism, an electric current is supplied to a movable coil member disposed within a magnetic field formed by a permanent magnet and a yoke to rotate the movable coil member about the optical axis of the taking lens and the taking lens is focused or the shutter is controlled for exposure by the rotative force of the movable coil member.

When this known electromagnetic driving mechanism is employed in a taking lens focusing device, the movement of the movable coil member is converted into a movement along the optical axis of the taking lens, for shifting the taking lens to a position corresponding to a measured object distance. The taking lens unit disposed outside the electromagnetic driving mechanism is interlocked directly with the movable coil member or interlocked with the movable coil member by means of an elastic member, such as a spring, pressed against the taking lens unit. Since the movable coil member of such a taking lens focusing device must be capable of operating against the weight of the taking lens and the pressure of the elastic member, the movable coil member must have a large driving capacity, and hence a magnetic field of a high intensity needs to be produced. Consequently, such an electromagnetic driving mechanism is unavoidably large and expensive.

Japanese Patent Laid-Open No. 58-43434 discloses a mechanism to reduce the load on the electromagnetic driving mechanism. In this mechanism, the movable coil member functions only to regulate the focus controlling member, namely, only to set a member to limit the focusing movement of the taking lens, while the taking lens is driven for focusing by a separate driving source other than the electromagnetic driving mechanism. This mechanism reduces the load on the movable coil member remarkably and provides a compact and inexpensive electromagnetic driving mechanism facilitating the incorporation of the electromagnetic driving mechanism into a compact camera.

However, this mechanism employs an elastic member as a driving source for driving the taking lens to a focus position and the strained elastic member is released suddenly upon the execution of shutter releasing operation, therefore, the camera is liable to be shaked when the shutter is released. Furthermore, this mechanism needs a complex charging mechanism for returning the elastic member to the initial position after the completion of taking operation, which affects adversely to the accessibility and the construction of the camera, and hence the practical application of this mechanism is extremely difficult.

SUMMARY OF THE INVENTION

Accordingly, it is an object of the present invention to provide an automatic focusing camera capable of accurately focusing the taking lens in multiple steps by means of an electromagnetic driving mechanism.

The object of the present invention is achieved by an automatic focusing camera capable of deciding a lens position corresponding to an object distance by driving a lens position control cam member disposed so as to be turned about the optical axis of the taking lens stepwise by a pulse signal given by a range finder. According to the present invention, the taking lens is adjusted at a focus position corresponding to a distance signal by turning a lens position control cam member formed integrally with a ratchet wheel mounted on a lens barrel by turning the ratchet wheel stepwise in one direction about the optical axis of the taking lens by reciprocating a click provided on the lens barrel with a pin atached to the movable coil member of an electromagnetic driving mechanism by causing the movable coil member to rock by supplying a pulse current corresponding to the distance signal.

It is a further object of the present invention to provide an electromagnetic driving mechanism for driving and controlling the light quantity control member and the taking lens of a compact and low-cost camera of simple construction.

This object of the present invention is achieved by an electromagnetic driving mechanism comprises a light quantity controlling movable coil member and a taking lens controlling movable coil member which are disposed one after the other in the same magnetic field formed by a permanent magnet and a yoke so that both the controlling members are subjected to magnetic field intensities corresponding to necessary driving forces respectively. Thus the electromagnetic driving mechanism controls and drives the light quantity controlling member and the taking lens with the light quantity controlling movable coil member and the taking lens controlling movable coil member which are disposed in a single gap in which a common magnetic field is produced.

It is a further object of the present invention to provide a taking lens driving mechanism capable of accurately returning a cam member for focusing the taking lens to the initial position after the completion of taking operation without using any charging mechanism.

This object of the present invention is achieved by a taking lens driving mechanism constituted so as to turn an annular cam member remaining at a taking lens focusing position after the completion of taking operation about the optical axis of the taking lens in the same direction as a direction of turning the annular cam member for focusing operation and to stop the turning motion of the annular cam member upon the actuation of a switch with a projection provided on the annular cam member when the annular cam member is returned to the original position. The taking lens driving mechanism is provided with an indicating means for stopping the cam member of the taking lens focusing device of a camera at the initial position thereof. The cam member is driven for turning by a signal provided by a distance measuring circuit to a position corresponding to the focus position of the taking lens.

It is a further object of the present invention to provide a lens positioning mechanism having a motor for driving the taking lens to a focus position and capable of surely regulating a focus controlling member with a small electromagnetic driving mechanism.

This object of the present invention is achieved by a lens positioning mechanism comprising a means to provide a signal indicating a lens position, a driving circuit for driving a lens driving motor, and a control circuit, wherein the duration of supplying an electric current to the driving circuit is controlled by the control circuit on the basis of a signal indicating a lens position. In bringing the taking lens into contact with or separating the taking lens from the focus controlling member by the lens driving motor actuated by the driving circuit mounted on the camera, the duration of supplying an electric current from the driving circuit to the lens driving motor is controlled by the control circuit on the basis of a signal provided by a distance measuring mechanism mounted on the camera.

It is a further object of the present invention to provide a taking lens driving circuit capable of focusing the taking lens by controlling the supply of a pulse current to an electromagnetic driving mechanism on the basis of distance information provided by a distance measuring circuit, and returning the taking lens after the completion of taking operation to the initial position of the taking lens without requiring any resetting operation.

This object of the present invention is achieved by a taking lens driving circuit capable of focusing the taking lens by supplying a pulse current corresponding to distance information provided by a driving circuit to turn a cam member adapted to rotate about the optical axis of the taking lens stepwise in one direction, and returning the taking lens to the initial position thereof. The taking lens driving mechanism includes an electromagnetic driving mechanism having yokes disposed opposite to each other between a distance measuring circuit and a fixed permanent magnet and a movable coil member disposed between the yokes, and moves the lens unit along the optical axis thereof by driving a cam member stepwise by the movable coil member which is reciprocated by a pulse driving current corresponding to the distance information provided by the distance measuring circuit. The cam member moved to a position corresponding to the distance information provided by the distance measuring circuit is returned to the initial position thereof by supplying an electric current again to the movable coil member.

Other objects, features and advantages of the present invention will become more apparent from the following description of the preferred embodiment thereof taken in conjunction with the accompanying drawings.

DESCRIPTION OF THE PREFERRED EMBODIMENTS

Figure 1:
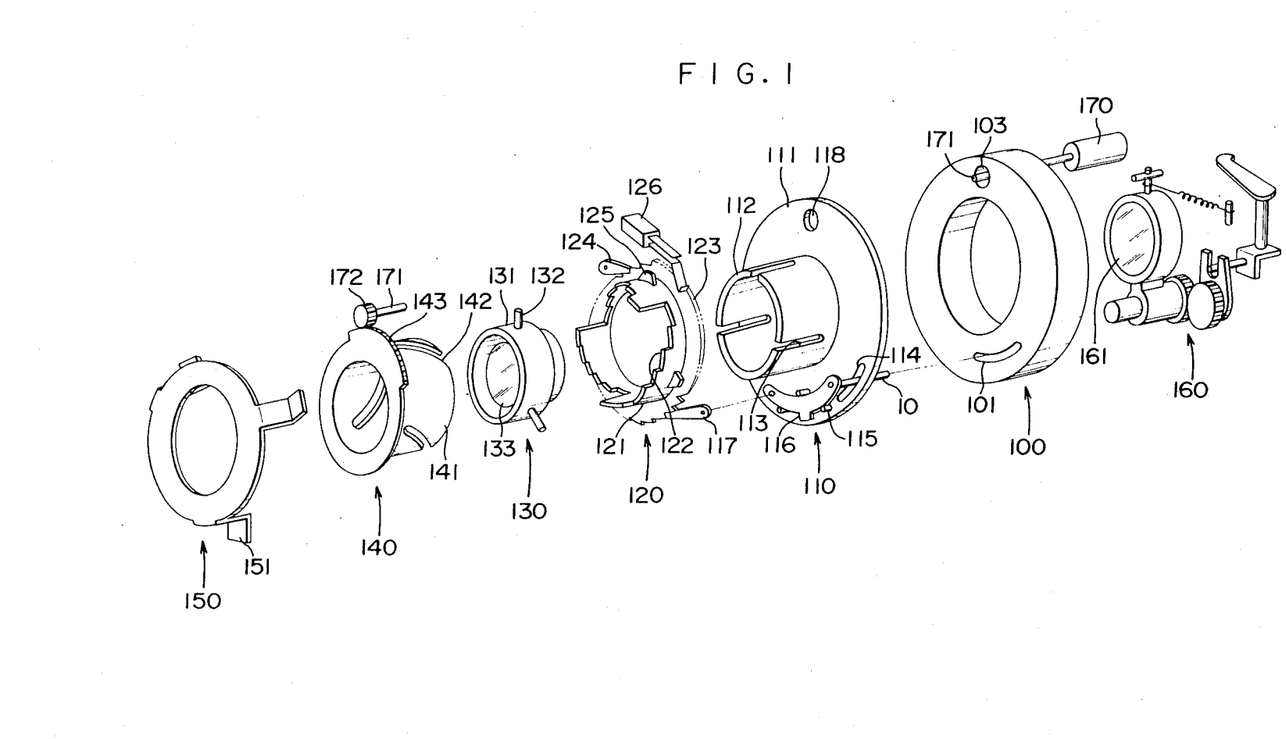
FIGS. 1 and 7 are exploded perspective view of focusing mechanisms in automatic focusing cameras embodying the present invention respectively.

FIGS. 1, 2, 3, 4 and 5 show a first embodiment of the present invention. Referring to FIG. 1 showing a taking lens focusing mechanism employed in an automatic focusing camera of the present invention in an exploded perspective view, an electromagnetic driving mechanism 100 is mounted on the lens barrel, not shown, of the camera. A lens driving base member 110 for supporting the component members of the taking lens focusing mechanism is attached to the front surface of the electromagnetic driving mechanism 100 with the flange 111 thereof screwed to the front surface of the electromagnetic driving mechanism 100.

Figure 2:
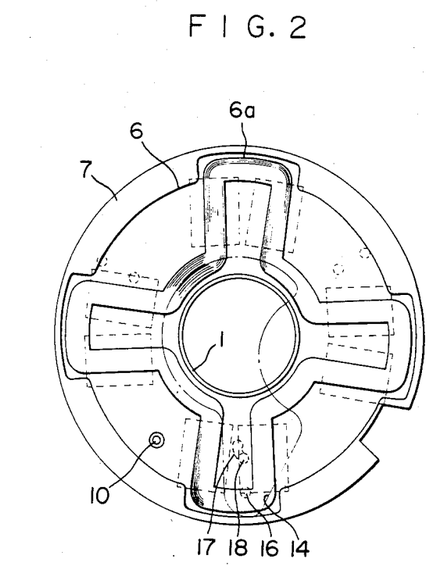
FIGS. 2, 3 and 4 are plan view, a sectional view and a perspective of an electromagnetic driving mechanism employed in an automatic focusing camera of the present invention respectively.
Figure 3:
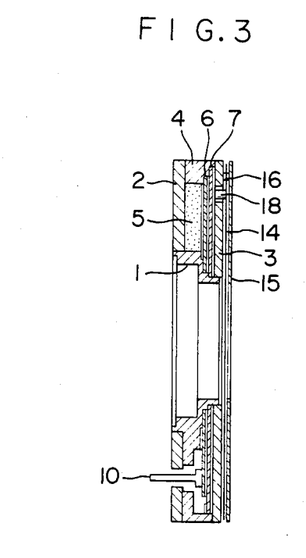
Figure 4:
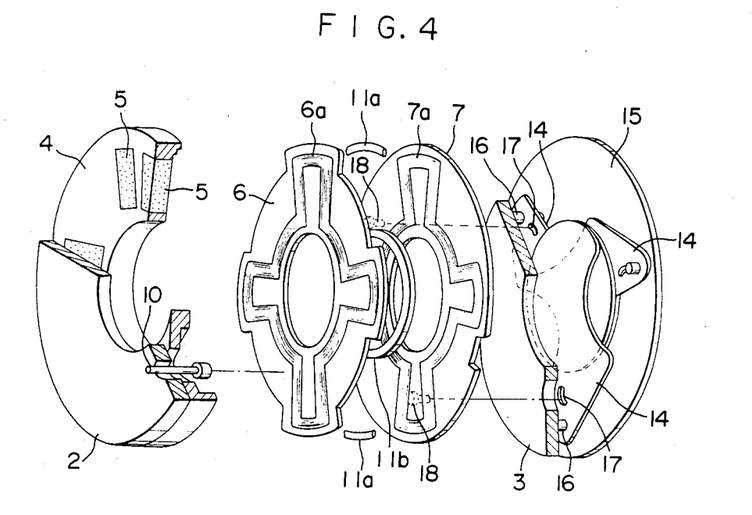

As shown in FIGS. 2, 3 and 4, the electromagnetic driving mechanism 100 comprises a body 1, a holding frame 4 formed around and integrally with the body 1, permanent magnets 5 arranged on the holding frame 4 at equal circumferential intervals, and first and second yokes 2 and 3 disposed opposite to each other with the permanent magnets 5 interposed therebetween. A first movable coil member 6, namely, a taking lens controlling movable coil member, having a coil pattern 6 and a second movable coil member 7, namely, a light quantity controlling movable coil member, having a coil pattern 7 are disposed within a gap between the permanent magnets 5 and the second yoke 3. A large annular spacer 11a and a small annular spacer 11b are provided between the first movable coil member 6 and the second movable coil member 7 to avoid the interference between the first movable coil member 6 and the second movable coil member 7. The spacer 11a and 11b may be fixed to or movable relatively to the holding frame 4.

The first yoke 2 is regulated in position and fixed on one side of the holding frame 4 by the attracting force of the permanent magnet 5. Further, the second yoke 3 is regulated in position and fixed on the other side of the holding frame 4 by the attracting force of the permanent magnet 5.

The gap within which the first and second movable coil members 6, 7 are inserted in the magnetic circuit formed between the permanent magnet 5 and the second yoke 3 is kept constant.

The first movable coil member 6 reciprocates fractionally when a pulse signal is given thereto by a built-in distance measuring circuit of the camera. The driving force of the first movable coil member 6 is transmitted to a member of the taking lens focusing mechanism by a rocking pin 10 attached to the first movable coil member 6.

The second movable coil member 7 reciprocates when an electric current is given thereto by a light quantity controlling circuit. A plurality of pins 18 attached to the second movable coil member 7 operates a set of shutter blades 14 interposed between the second yoke 3 and a base plate 15 so that the shutter blades 14 turn on shafts 16 respectively, when the second movable coil member 7 reciprocates.

As described above, the magnetic gap in the electromagnetic driving mechanism 100 is determined by the configuration of the holding frame 4 and the permanent magnet 5 which can be formed with high precision, so that the intensity of the magnetic field becomes stable and therefore a suitable magnetic force or driving force can be applied on said first and second moving coil members 6, 7, respectively. A cylindrical part 141 of a lens driving member 140 is fitted in a cylindrical part 112 of the lens driving base member 110 for rotary and sliding motion therein. A casing 131 of a taking lens unit 130 is fitted in a cylindrical part 141 for rotary and sliding motion therein. Three pins 132 projecting radially from the outer circumference of the casing 131 are fitted in three helical slots 142 formed in the cylindrical part 141 of the lens driving member 140 and in three straight slots 113 formed in the cylindrical part 112 of the lens driving base member 110 respectively. The outer ends of the pins 132 project outward from the outer circumference of the cylindrical part 112.

A lens position controlling cam member 120 is fitted rotatably on the cylindrical part 112 of the lens driving base member 110 adjacently to the flange 111 of the lens driving base member 110 so that three stepped cams 122 formed in the edge of the cylindrical part 121 correspond to the pins 132 projecting radially from the cylindrical part 112 of the lens driving base member 110 respectively.

A ratchet wheel 123 formes the flange of the cam member 120. A clock 117 attached to an arcuate member 116 which reciprocates in circumferential directions on the lens driving base member 110 drives the cam member 120 stepwise in a clockwise direction. A pawl 124 provided at a fixed position on the front plate of the camera restricts the counterclockwise rotation of the cam member 120. The clock 117 and the pawl 124 are urged clockwise by elastic members, not shown, so as to be always in contact with or in engagement with the ratchet wheel 123.

The arcuate member 116 is connected to the rocking pin 10 of the first movable coil member 6, extending through a slot 101 formed in the front surface of the electromagnetic driving mechanism 100 and a slot 114 formed in the range 111 of the lens driving base member 100 and projecting from the flange 111. The arcuate member 116 slides along guide rollers 115 attached to the flange 111 in circumferential directions when the first movable coil member 6 reciprocates.

Three projections 125 are provided on the circumference of the cylindrical part 121 of the cam member 120. When the stepped cams 122 reach the respective initial positions as the cam member 120 is turned, the projection 125 actuates a switch 126 to interrupt the supply of a pulse current to the first movable coil member 6 so that the stepwise movement of the cam member 120 is stopped.

A driving motor 170 is accommodated in the lens barrel. The output shaft 171 of the driving motor 170 extends through a through hole 103 formed in the electromagnetic driving mechanism 100 and a through hole 118 formed in the flange 111 of the lens driving base member 110. A pinion 172 attached to the free end of the output shaft 171 engages a segment gear 143 formed on the lens driving member 140. The taking lens unit 130 including a taking lens 133 can be moved along the optical axis thereof by driving the lens driving member 140 by the driving motor 170.

The functions of the first embodiment will be described hereinafter.

Upon the reception of a signal from the range finder of the camera, the control circuit gives a pulse signal of pulses corresponding to the detected distance to the first movable coil member 6. Then, the rocking pin 10 rocks in the circumferential directions by a frequency corresponding to the number of pulses of the pulse signal.

Consequently, the click 117 attached to the arcuate member 116 drives the cam member 120 stepwise in a clockwise direction to locate the respective steps of the stepped cams 122 corresponding to the detected distance at positions corresponding to the pins 132 of the lens unit 130 respectively.

Then the control circuit provides a signal to actuate the driving motor 170, and thereby the output shaft 171 of the driving motor 170 starts rotating in a clockwise direction to rotate the lens driving member 140 counterclockwise. Consequently, the pins 132 of the lens unit 130 is driven by the helical slots 142 to be moved backward along the straight slots 113, and thereby the lens unit 130 is moved backward until the pins 132 are brought into abutment with the steps of the stepped cams corresponding to the detected distance so that the taking lens 133 is focused. Then, the driving motor 170 is stopped.

Then, an electric current is supplied to the second movable coil member 7 of the electromagnetic driving mechanism 100 to operate the shutter blades 14. After the exposure operation has thus been completed, the driving motor 170 starts rotating counterclockwise to rotate the lens driving member 140 clockwise so that the lens unit 130 is moved forward toward the initial position. Upon the arrival of the lens unit 130 at the foremost position, namely, the initial position, the driving motor 170 stops.

Then, the control circuit gives a pulse signal again to the first movable coil member 6 to make the click 117 turn the cam member 120 stepwise until the highest steps of the stepped cams 122 arrive at positions corresponding to the pins 132 of the lens unit 130 respectively. Upon the arrival of the highest steps at the above-mentioned positions, the projection 125 actuates the switch 126 to interrupt the pulse signal given by the control circuit, so that the cam member 120 stops.

Thus, the lens driving member 140, the lens unit 130 and the cam member 120 are returned to their respective initial position where they were located before the taking operation and the lens driving member 140, the lens unit 130 and the cam member 120 are prepared for the next taking operation.

Thus, according to the present invention, the cam member 120 is turned only in one direction for both deciding a focus position of the taking lens and being returned to its initial position, and hence any resetting mechanism is not necessary. Furthermore, since the stepped cams 122 are formed in the circumference of the cam member 120, the stepped cam 122 can be formed in a comparatively wide circumferential range, and hence the focus position of the taking lens 133 can be adjusted at smaller steps.

Still further, since the cam member 120 and the click 117 for driving the cam member 120 are mounted on the lens driving base member 110, the focusing device can be formed in an extremely compact construction. If the mechanism is constituted so as to be capable of temporarily locking the operation of the driving motor 170, the taking lens 133 can be prefocused to facilitate the taking operation of the camera.

A restricting member 150 is attached by the legs 151 thereof to the front surface of the lens driving base member 110 to define the respective positions of the lens driving member 140 and the cam member 120 along the optical axis. Indicated at 161 is a conversion lens capable of being brought into alignment with the optical axis or retracted from the optical passage by a changing device 160. The conversion lens 161 is combined with the taking lens 133 to change the focal length of the lens system.

This embodiment enables the taking lens to be focused more accurately on an object and eliminates an operation for resetting the focusing mechanism to the initial state, which is quite advantageous to an automatic focusing camera.

As apparent from what has been described hereinafter, the movable coil members of the electromagnetic driving mechanism of the present invention are disposed so as to utilize the magnetic flux effectively, therefore, the electromagnetic driving mechanism has a simple construction. Furthermore, since the electromagnetic driving mechanism of the present invention is constructed in a unit and adapted to be connected to a focusing mechanism with a single pin, the assembly and adjustment of the camera are extremely facilitated. The present invention thus provides a simple, high-performance and compact electromagnetic driving mechanism, and the employment of the electromagnetic driving mechanism of the present invention realizes as inexpensive and compact camera capable of carrying out a taking lens focusing operation and a light quantity controlling operation by the agency of electromagnetic force.

Furthermore, according to the present invention, the cam member which has been stopping the taking lens at a focus position during a taking operation is turned stepwise again after the completion of the taking operation in the same direction as the direction in which the cam member was turned for focusing operation until the cam member arrives and is stopped automatically at the initial position thereof, which allows the taking lens to be returned to the initial position thereof where the taking lens is to be located before the focusing operation.

Accordingly, an automatic focusing camera equipped with the electromagnetic driving mechanism of the present invention does not need any mechanism for turning the cam member after the completion of taking operation in a direction reverse to the direction in which the cam member is turned for focusing operation, namely, any complex charging mechanism for resetting the cam member. Furthermore, since the taking lens 133 is stopped accurately at the initial position thereof by the action of the switch and a pulse signal is given to the movable coil member 6 always with the taking lens 133 positioned at the initial position, the taking lens 133 is focused highly accurately.

According to the present invention, the supply of the pulse signal to the first movable coil member 6 is stopped upon the actuation of the switch 126 after the lens unit 130 has been returned to the initial position thereof after the completion of the taking operation, and the number of pulses given to the first movable coil member 6 for focusing operation corresponds to the necessary number of steps of the stepped cams 122 to be moved for focusing operation. Therefore, it is also possible to stop the supply of the pulse signal to the first movable coil member 6 for driving the first movable coil member 6 again after the exposure operation to return the lens unit 130 to the initial position, by storing a number of pulses corresponding to the rest of the steps of the stepped cams 122 in the control circuit and comparing the stored number of pulses and the signal given by the switch 126 for deciding the interruption of the supply of the pulse signal to the first movable coil member 6. That is, if the stored number of pulses is smaller than that corresponding to the rest of the steps of the stepped cams 122 for some reason, the supply of the pulse signal is continued until the switch 126 is actuated and, on the other hand, if the stored number of pulses is greater than that corresponding to the rest of the steps of the stepped cams 122, the supply of the pulse signal is interrupted when the switch 126 is actuated.

This embodiment simplifies the construction of the taking lens focusing mechanism, particularly, the construction of the mechanism for returning the taking lens to the initial position at the end of the taking operation, and enables accurate focusing of the taking lens by starting the focusing operation with the taking lens positioned at the initial position thereof.

Furthermore, in another embodiment of the present invention, the distance measuring circuit and the control circuit are constituted so as to supply an electric current to the driving circuit for driving the motor only for a time necessary for moving the taking lens to the focus position and, after the exposure operation, to supply a reverse electric current to the driving circuit for a time necessary to return the taking lens to the initial position thereof.

Figure 5:
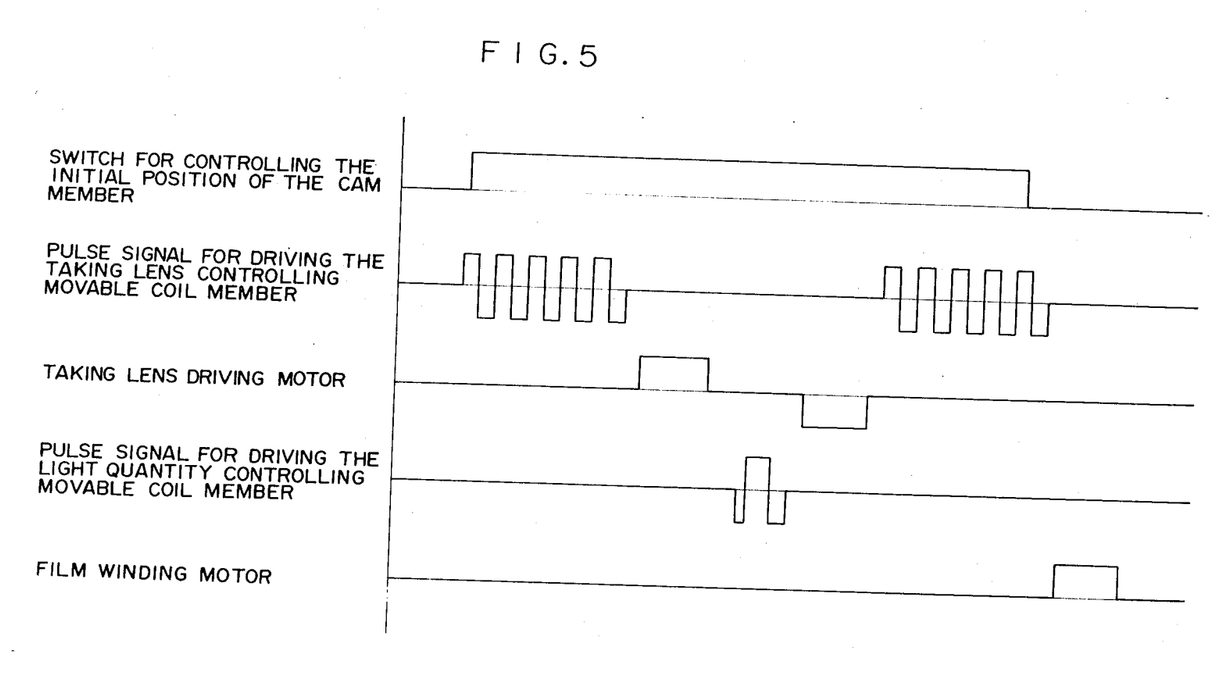
FIG. 5 is a time chart showing a series of operations of the focusing mechanism of FIG. 1.
Figure 6:
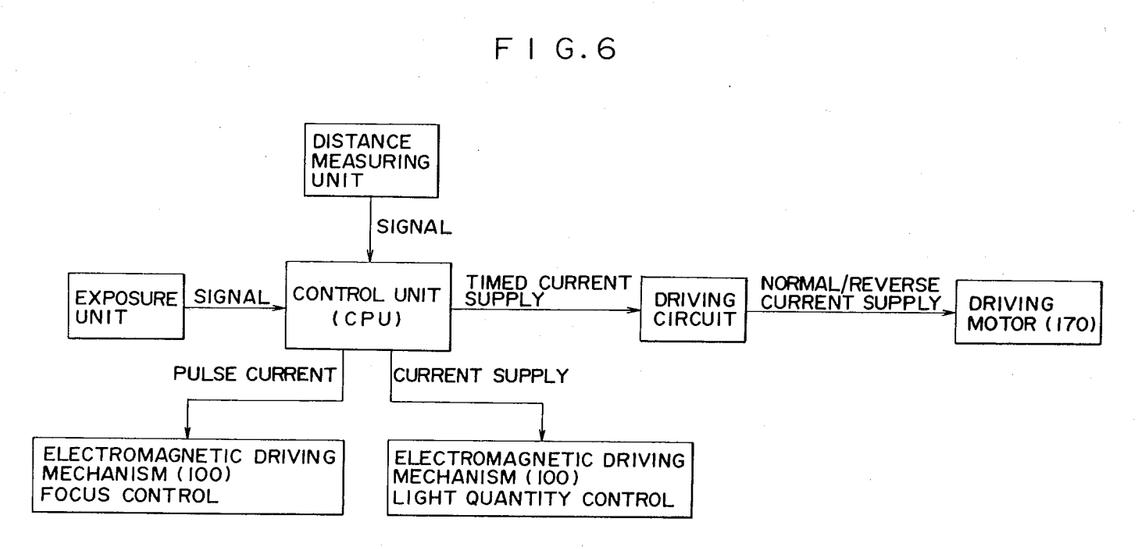
FIGS. 6 and 8 are block diagrams of control circuits of the embodiments of the present invention respectively.

FIG. 5 is a time chart showing the respective operating timings of the functional units and FIG. 6 is a block diagram showing the relation between the functional units.

Although the electromagnetic driving mechanism 100 and the driving motor 170 are incorporated into the lens barrel in the above-mentioned embodiments, the same functions are available even if the electromagnetic driving mechanism 100 and the motor 170 are incorporated into the body of the camera.

In this embodiment, the taking lens is moved to a focus position and is returned to the initial position thereof by supplying an electric current to a driving motor for a time corresponding to the movement of the taking lens necessary for focusing or for returning the same to the initial position. Accordingly, the taking lens focusing device of the camera reduces the load on the electromagnetic driving mechanism in focusing the taking lens remarkably.

Figure 7:
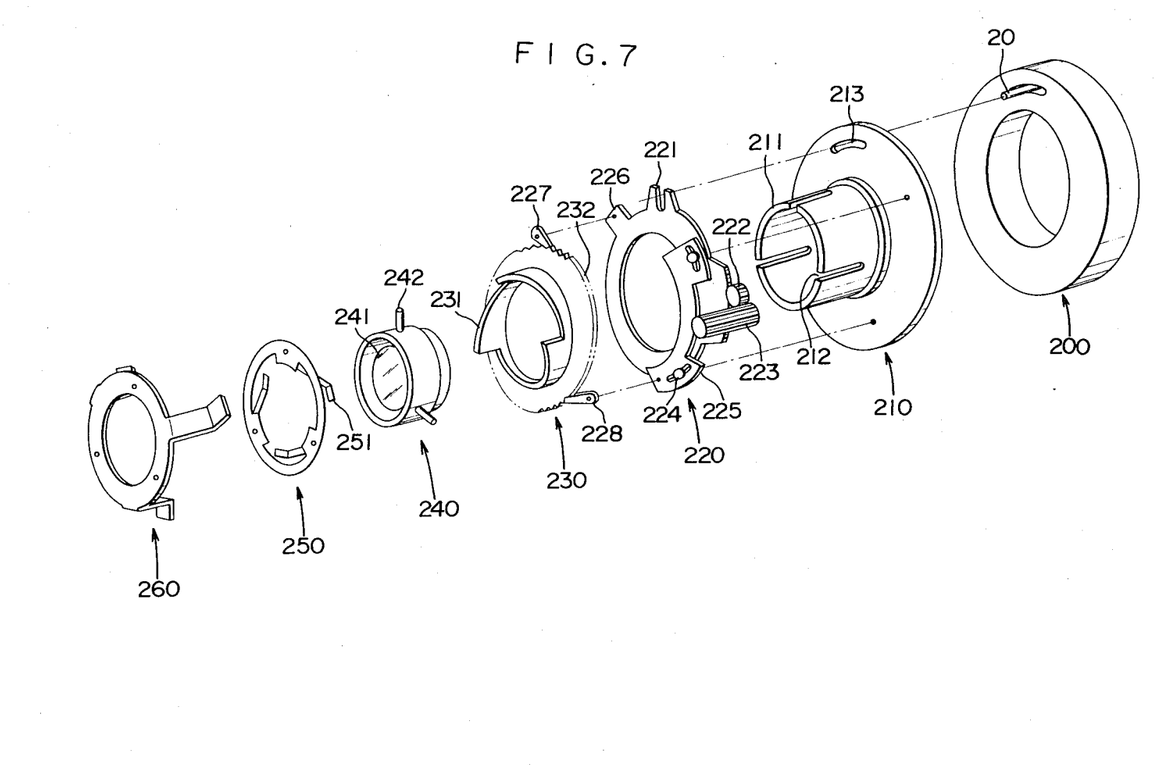

FIG. 7 shows another embodiment of the present invention. Referring to FIG. 7, a lens driving base member 210 is attached to the front surface of an electromagnetic driving mechanism 200, a segment gear plate 220 and a cam member 230 is rotatably fitted one after the other on a cylindrical part 211 of the lens driving base member 210, and a lens unit 240 having a taking lens 241 is fitted in the cylindrical part 211 of the lens driving base member 210.

Three pins 242 radially projecting from the circumference of the lens unit 240 engage three straight slots 212 formed in the cylindrical part 211 of the lens driving base member 210 to guide the lens unit 240 slidably along the optical axis of the taking lens. The lens unit 240 is urged continuously toward the lens driving base member 210 by three legs 251 of a spring plate 250 combined with a holding member 260 attached to the front surface of the lens driving base member 210. Accordingly, the position of the taking lens 241 is decided by the abutment of the pins 242 on the cam surfaces 231 of the cam member 230.

A pin 20 of the first movable coil member 6 of the electromagnetic driving mechanism 200 extends through a slot 213 formed in the flange of the lens driving base member 210 and engages a bifurcate projection 221 formed on the segment gear plate 220. The same rotative movement as that of the segment gear plate 220 is transmitted through a gear wheel 222 which rotates on a fixed shaft attached to the flange of the lens driving base member 210 and a gear wheel 223 engaging the gear wheel 222 to a sector gear 225 arranged so as to be guided by a pair of pins 224 fixed to the flange of the lens driving base member 210 and capable of being turned about the optical axis.

Clicks 227 and 228 urged clockwise by elastic members, not shown are attached pivotally to a projection 226 formed on the segment gear plate 220 and to one end of the sector gear 225 respectively. The clicks 227 and 228 engage a ratchet wheel 232 formed integrally with the cam member 230.

When a pulse signal is supplied to the first movable coil member, not shown, of the electromagnetic driving mechanism 200, the first movable coil member reciprocates and the reciprocating motion of the first movable coil member is transmitted to the segment gear plate 220 by the rocking pin 20. While the pin 20 move clockwise, the click 227 acts on the ratchet wheel 232 and while the pin 20 moves counterclockwise, the click 228 acts on the ratchet wheel 232. Accordingly, one pulse signal causes the cam member 230 to turn by two steps, which moves the taking lens 241 efficiently toward a focus position. This embodiment has the same advantage as that of the first embodiment that the cam member 230 is returned to the initial position thereof after the completion of the taking operation by being turned in the same direction as that for focusing the taking lens 241, and hence any resetting mechanism for resetting the cam member 230 is not necessary.

Figure 8:
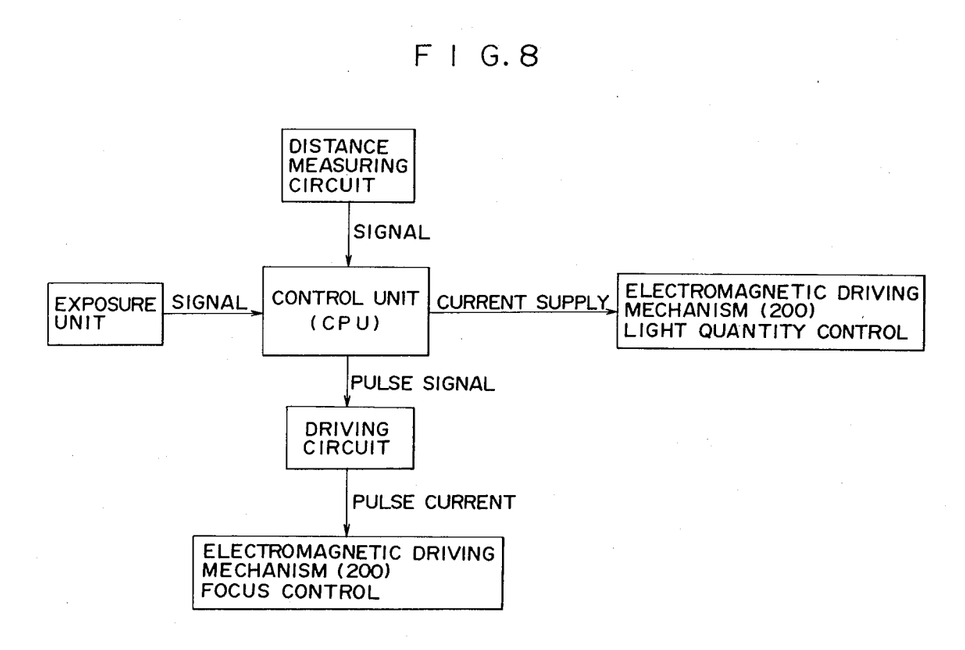

In this embodiment, as shown in FIG. 8, a distance signal provided by a distance measuring circuit is converted into pulses by a control circuit and a driving circuit supplies an electric current of pulses corresponding to the detected distance to the first movable coil member 6 of the electromagnetic driving mechanism 200.

Consequently, the segment gear plate 220 reciprocates as the first movable coil member 6 reciprocates and the clicks 227 and 228 each turns the cam member 230 clockwise by a step corresponding to one tooth of the ratchet wheel 232, when the segment wheel plate turns clockwise and counterclockwise respectively.

Accordingly, the lens unit 240 is pushed forward by the cam surfaces 231 of the cam member 230 as the cam member 230 is turned stepwise. After the pulses of a number corresponding to the detected distance have been given to the first movable coil member 6, the cam member 230 stops at a position corresponding to the detected distance to hold the taking lens 241 at the focus position.

Then, the control circuit supplies an electric current to the second movable coil member 7 of the electromagnetic driving mechanism 200 on the basis of a signal given by an exposure circuit, for a time corresponding to a necessary exposure to operate the shutter blades 14 appropriately. After the exposure operation has been completed, a pulse signal is supplied again to the first movable coil member 6 to turn the cam member 230 clockwise.

The number of pulses of the electric current supplied by the driving circuit to the first movable coil member 6 for returning the cam member 230 to the initial position thereof is such a number sufficient to turn the cam member 230 by one cycle, namely, one third of a full turn in this embodiment.

Thus the taking lens driving circuit of the present invention supplies pulse currents to drive the cam member stepwise only in one direction for both moving the taking lens to a focus position and returning the same from the focus position to the initial position thereof.

Accordingly, any complicated charging mechanism for resetting the taking lens is not necessary and, since the cam member is turned only in one direction for driving the taking lens in one direction, accurate focusing of the taking lens is achieved.

As mentioned above, since this embodiment employs a double-acting click mechanism which drives the taking lens by two steps for every pulse of an electric current given by the driving circuit to the first movable coil member for one reciprocation of the same, the direction of a first pulse current to be supplied to the first movable coil member is reverse to the direction of the last pulse current supplied for focusing the taking lens. For the same reason, when a single-acting click mechanism which drives the taking lens only one step only when the first movable coil member turns either clockwise or counterclockwise, the direction of a first pulse current to be supplied for returning the taking lens to the initial position is the same as that of the last pulse current for focusing the taking lens.

This embodiment eliminates a resetting mechanism for returning the taking lens to the initial position thereof after the taking operation from the focusing device, which simplifies the focusing mechanism and improves the focusing accuracy and functions.

What is claimed is:

1. An automatic focusing camera comprising
   (a) means for detecting a distance to an object and for generating a distance signal;
   (b) means for converting said distance signal into a pulse signal having a pulse number corresponding to said distance;
   (c) a lens;
   (d) means for controlling a position of said lens, said means for controlling being capable of moving in a first direction;
   (e) an electromagnetic driving means having a reciprocally moving element corresponding to said pulse signal,
      said electromagnetic driving means driving said means for controlling stepwise in said first direction by an amount corresponding to said pulse number whereby said means for controlling is moved from at least one initial position to a focusing position; and
   (f) means for actuating said driving means for a period after an exposure of said object so that said means for controlling is moved in said first direction from said focusing position to one of said at least one initial position.

2. The camera of claim 1 wherein said lens position control means is a cylindrical member having a cam at an end surface thereof.

3. The camera of claim 2 wherein said lens position control means is moved stepwise and returned to its initial position by said electromagnetic drive means.

4. The camera of claim 3 wherein said means for generating the pulse signal generates a pulse signal necessary for returning the lens position control means to its initial position after photographing.

5. The camera of claim 2 wherein the cam is first moved stepwise, and then the lens is brought into abutment with the cam to determine a lens position.

6. The camera of claim 3 wherein the cam is first moved stepwise, and then the lens is brought into abutment with the cam to determine a lens position.

7. The camera of claim 1 wherein said electromagnetic driving means comprises a light quantity controlling movable coil member and a taking lens driving and controlling movable coil member, both the light quantity controlling movable coil member and the taking lens driving and controlling movable coil member being disposed within a gap and exposed to a common magnetic field.

8. The camera of claim 7 wherein one or two movable coil members are used for driving and/or controlling said lens.

9. The camera of claim 7 wherein a plurality of said movable coil members are separated from each other by spacers for obviating interference between the adjacent movable coil members.

10. The camera of claim 8 wherein a plurality of said movable coil members are separated from each other by spacers for obviating interference between the adjacent movable coil members.

11. The camera of claim 7 wherein the lens driving and controlling movable coil member is adjacent permanent magnets.

12. The camera of claim 8 wherein the lens driving and controlling movable coil member is adjacent permanent magnets.

13. The camera of claim 9 wherein the lens driving and controlling movable coil member is adjacent permanent magnets.

14. The camera of claim 3 further comprising an indicating means to stop the cam at the initial position thereof.

15. The camera of claim 1 further comprising said lens position control means having a means to provide a signal indicating a lens position, a driving circuit for driving a motor for driving the lens, and a control circuit, so that the control circuit controls the duration of supplying an electric current to the driving circuit on the basis of said signal indicating a lens position.

16. The camera of claim 15 wherein a lens position is determined by bringing the lens, by the motor driven by the driving circuit, into abutment with a cam member controlled by the control circuit.

17. The camera of claim 1 comprising said lens position control means being a cylindrical member having a cam at an end surface thereof and comprising distance measuring circuit and an electromagnetic driving mechanism having movable coil members disposed between fixed permanent magnets and a yoke disposed opposite to the permanent magnets, and adapted to move a lens unit along the optical axis thereof by driving the cam stepwise by the movable coil member which is reciprocated by a driving pulse current corresponding to distance information provided by the distance measuring circuit, a taking lens driving circuit which returns the cam which has been moved to a position corresponding to the distance information provided by the distance measuring circuit to the initial position thereof by supplying an electric current again to the movable coil member.

18. The camera of claim 17 wherein the cam is returned to its initial position by supplying an electric current corresponding to a number of pulses equivalent to the difference between said pulse number and a predetermined number of pulses.

19. The camera of claim 17 wherein the polarity of said pulses is changed alternately.

20. The camera of claim 17 wherein the direction of the first pulse current to be supplied again after interruption of the supplying pulse currents is opposite to the direction of the last pulse current supplied before interruption of the supplying pulse currents.

21. The camera of claim 18 wherein the direction of the first pulse current to be supplied again after interruption of the supplying pulse currents is opposite to the direction of the last pulse current supplied before interruption of the supplying pulse currents.

22. The camera of claim 17 wherein the direction of the first pulse current to be supplied again after interruption of the supplying pulse currents is the same as that of the last pulse current supplied before interruption of the supplying pulse currents.

* * * * *